Jan. 9, 1951 J. P. PALMER 2,537,696

STABILIZED FREQUENCY DIVIDER CIRCUIT

Filed Sept. 14, 1945

INVENTOR
JAMES P. PALMER

BY Ralph L. Chappell

ATTORNEY

Patented Jan. 9, 1951

2,537,696

UNITED STATES PATENT OFFICE 2,537,696

STABILIZED FREQUENCY DIVIDER CIRCUIT

James P. Palmer, Boston, Mass., assignor, by mesne assignments, to the United States of America as represented by the Secretary of the Navy Application September 14, 1945, Serial No. 616,414

2 Claims. (Cl. 250—36)

This invention relates to frequency divider circuits and in particular to a stabilized blocking oscillator circuit for use as a frequency divider.

In many applications of electronic circuits it is desired to obtain a pulse of output energy corresponding to every *n*th pulse only of a series of periodic pulses fed into the circuit, and with no response or output corresponding to the remainder of the input pulses. For example, if from such a circuit only every tenth input pulse produces an output pulse corresponding to it, while the intermediate nine pulses do not cause any output, there is thus produced a periodic submultiple series of output pulses whose frequency is related to the series of input pulses by a definite ratio, in this case, one to ten. The principal difficulty to be overcome in circuits for this purpose is to assure that the output will be responsive to exactly the correct input pulse and not the one before or after it as the result of some slight variation in supply voltages and tube characteristics.

It is therefore the object of this invention to provide a frequency dividing, blocking oscillator circuit which is largely insensitive to variation in supply voltages and tube characteristics, and hence stable and reliable in its operation.

Figure 1:
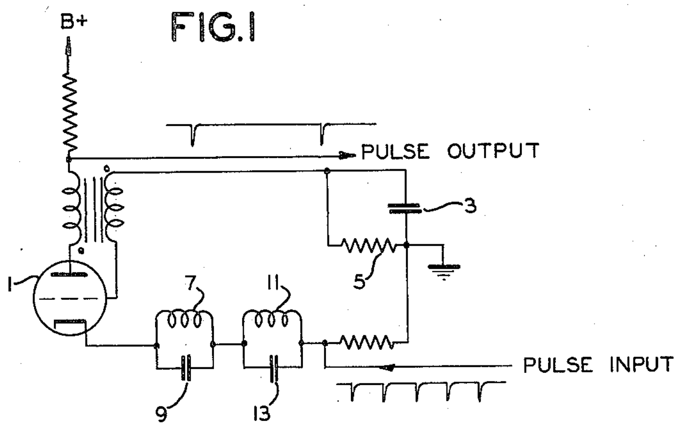
Figure 2:
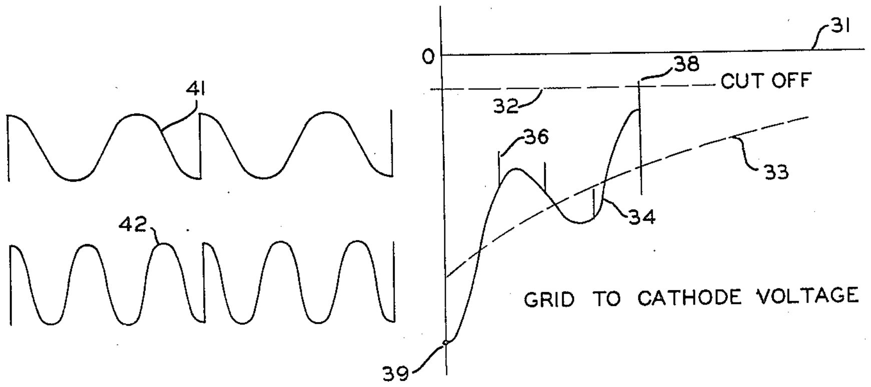

Fig. 1 is a circuit diagram of a blocking oscillator, conventional in all respects except for the addition in series in the cathode circuit of two parallel-resonant combinations or resonant L-C ringing circuits; and Fig. 2 is a graph showing the form of the net grid to cathode voltage relation which is produced by the combination of voltages from input pulses, the ordinary blocking oscillator operation, and A. C. voltages deriving from the inserted L-C circuits.

Referring now to Fig. 1, there is shown a blocking oscillator triode tube 1 having conventional close transformer coupling, approximating unity coupling. The grid of this circuit like that of the conventional blocking oscillator has a capacitor 3 and a resistor 5 in parallel. Here, however, there is also inserted in the cathode circuit, in series, two L-C parallel resonant ringer circuits, one consisting of inductance 7 and capacitor 9 and the other of an inductance 11 and capacitor 13. As is well known, the grid-to-cathode voltage of the blocking oscillator is rapidly driven considerably negative when the tube conducts and normally rises back from below cutoff to conduction level again along an exponential curve determined by the time constant of the R-C circuit of resistor 5 and capacitor 3. (This is indicated by the dotted line 33 of Fig. 2).

In this circuit, however, when the tube 1 conducts the cathode current must also pass through the capacitors 9 and 13. When the oscillator blocks and the tube 1 ceases to conduct oscillations are set up in the two L-C circuits inserted in the cathode circuit. The resonant frequencies of these two circuits are chosen in this instance so that two different alternating voltages are produced and such that their algebraic addition produces an alternating voltage with high crests and low ones, which resultant is impressed on the cathode voltage.

In the prior art circuit for carrying out the same fundamental idea of superimposing an alternating voltage upon the normal grid-cathode voltage of a blocking oscillator so that a desired pulse might be placed on a crest, and preceding and following pulses might be depressed or submerged to avoid possibility of conduction for the latter and to assure conduction for the desired one, the device of L-C ringing circuits was also employed. In the earlier form, however, the L-C circuits were inserted in the grid circuit of the blocking oscillator. Since the amplitude of the alternating voltages produced by the ringing circuits in that case depended on the magnitude of the grid current they depended also upon the grid circuit capacitor and also upon highly variable tube characteristics. In the present circuit, however, the current which flows through the L-C ringers 7—9 and 11—13 is the cathode current and there results a greater dependability of the alternating voltage amplitudes and consequently greater reliability in the frequency division.

Fig. 2 shows a graph of the grid to cathode voltage showing a zero reference line 31 and cutoff voltage difference line 32. Dotted line 33 represents the curve which the voltage difference would follow in returning from its initial cutoff value back toward conduction value. Superimposed on it is shown the resultant alternating voltages from the L-C ringers, represented by line 34. The incoming pulses being fed also into the cathode circuit are also shown as a series of pips riding on the A. C. wave form, one pip, for example, being the one numbered 36. When the net result of grid return potential 33, A. C. voltage 34 and a pulse, for example 38, combine to reach a grid-cathode voltage difference which is above the cutoff value 32, their conduction will occur and the cycle of events will repeat. Fig. 2 also includes two illustrative A. C. voltages 41 and 42 which might be produced by the respective L-C ringing circuits 7—9 and 11—13. Their resultant 34, which is a periodic irregular wave form, has been shown superimposed on the normal grid return line 33. It should be understood, however, that the L-C ringing combination in the cathode circuit need not be restricted to two particular ones, but that various combinations of amplitude, frequency, and number of A. C. components may be employed, adapted to any particular frequency division ratio desired and to the other elements of the circuit. The scope of the invention therefore should not be deemed limited by the figures which are exemplary only.

I claim:

1. A synchronized frequency divider for dividing the frequency of a repeated succession of pulses, comprising a blocking oscillator circuit including an electron tube having at least a control grid and a cathode, a first resistor and condenser connected in parallel in the grid circuit of said oscillator, a plurality of parallel combinations of inductance and capacitance serially connected with a second resistor between said cathode and ground, and a means for applying said succession of pulses across said second resistor, said parallel combinations of inductance and capacitance being of such values that the resultant of the alternating voltages produced therein when said oscillator blocks is an alternating voltage having alternate high and low crests, said resultant voltage when superimposed on the grid-cathode voltage of said tube thereby raising certain desired submultiple pulses of said succession and greatly depressing pulses immediately preceding and immediately following said desired pulses, whereby a desired submultiple series of output pulses is obtained.

2. In a blocking oscillator circuit for the division of a repeated succession of input pulses, a plurality of parallel combinations of inductance and capacitance serially connected with a resistor between the cathode of the tube of said blocking oscillator and ground, and means for applying said input pulses across said resistor, said parallel combinations being of such values that the resultant of the alternating voltages produced therein when said oscillator blocks is an alternating voltage having alternate high and low crests, said resultant voltage when impressed on the grid-cathode voltage of said tube thereby raising certain desired submultiple pulses of said succession and greatly depressing pulses immediately preceding and immediately following said desired pulses, whereby a desired submultiple of output pulses is obtained independent of variations in voltage supply and tube characteristics.

JAMES P. PALMER.

REFERENCES CITED

The following references are of record in the file of this patent:

UNITED STATES PATENTS

| Number | Name | Date |
|---|---|---|
| 1,930,278 | Marrison | Oct. 10, 1933 |
| 1,994,760 | Eitel | Mar. 19, 1935 |
| 2,205,233 | Van Slooten | June 18, 1940 |
| 2,277,000 | Bingley | Mar. 17, 1942 |
| 2,358,297 | Bedford | Sept. 19, 1944 |
| 2,382,954 | Beaudoin | Aug. 21, 1945 |
| 2,399,135 | Miller et al. | Apr. 23, 1946 |